United States Patent [19]
Greer et al.

[11] Patent Number: 5,969,316
[45] Date of Patent: Oct. 19, 1999

[54] SMART CARD FOR OFFLINE AUTOMATED MEAL PLANS

[75] Inventors: Dennis Keith Greer, Worthington; Frank Eldon Wilhoit, III, Centerburg, both of Ohio

[73] Assignee: Cybermark LLC, Columbus, Ohio

[21] Appl. No.: 08/955,680

[22] Filed: Oct. 22, 1997

[51] Int. Cl.⁶ .............................. G06F 17/00; G06K 19/06
[52] U.S. Cl. ............................................ 235/375; 235/492
[58] Field of Search .................................... 235/381, 382, 235/492, 382.5, 375; 705/1, 15, 16, 44

[56] References Cited

U.S. PATENT DOCUMENTS

| | | | |
|---|---|---|---|
| 4,524,266 | 6/1985 | Krakauer et al. | 235/377 |
| 5,224,173 | 6/1993 | Kuhns et al. | 382/2 |
| 5,231,569 | 7/1993 | Myatt et al. | 364/408 |
| 5,243,171 | 9/1993 | Wood et al. | 219/386 |
| 5,374,818 | 12/1994 | Bianco et al. | 235/492 |
| 5,491,326 | 2/1996 | Marceau et al. | 235/381 |
| 5,536,045 | 7/1996 | Adams | 283/67 |
| 5,553,155 | 9/1996 | Kuhns et al. | 382/115 |
| 5,557,516 | 9/1996 | Hogan | 364/406 |
| 5,559,313 | 9/1996 | Claus et al. | 235/380 |
| 5,577,121 | 11/1996 | Davis et al. | 380/24 |
| 5,649,118 | 7/1997 | Carlisle et al. | 395/241 |
| 5,679,945 | 10/1997 | Renner et al. | 235/492 |

*Primary Examiner*—Donald Hajec
*Assistant Examiner*—Daniel Sherr
*Attorney, Agent, or Firm*—Banner & Witcoff, Ltd.

[57] ABSTRACT

This invention involves the use of smart cards configured with data indicating a specific meal plan for use in the food vending industry. Examples of typical applications are student meal plans purchased in college or other school systems where the user purchases a plan allowing the user to eat specific meals or at specific times. Usually the meal plan is purchased at the beginning of the school term and terminates at the end of the school term. The invention uses a memory based smart card that is preconfigured on a specific date. The smart card contains data such as the meal plan type, the expiration date of the plan, the last transaction date, the user's weekly quota of meals, the number of meals a user can eat in a day, the user's daily quota and the operator identification. The smart card is configured by a computer at the start of the meal plan. Smart card readers are used to update data on the smart card and decrement existing data as the user purchases meals.

19 Claims, 3 Drawing Sheets

FIG.1

| 0 | A   O   Plan Code |
|---|---|
| 1 | Expiration Date |
| 2 | |
| 3 | Last Transaction Date |
| 4 | |
| 5 | Weekly Quota |
| 6 | Meal 1 Quota |
| 7 | Meal 2 Quota |
| 8 | Meal 3 Quota |
| 9 | Meal 4 Quota |
| 10 | Meal 5 Quota |
| 11 | Meal 6 Quota |
| 12 | Daily Quota |
| 13 | Operator ID |
| 14 | |

SMART CARD FOR OFFLINE AUTOMATED MEAL PLANS

BACKGROUND OF THE INVENTION

This invention relates to smart cards and their use in an offline, automated meal plans scheme for use in school cafeterias or corporate restaurants.

Background of the Prior Art

Smart card systems employ two types of cards. One employs a microprocessor and a memory storage area. The second type of smart card employs only a memory storage area. Smart cards are approximately the same size as a standard credit card and contains read only memory or read/write memory (random access memory) on the card. The information stored in the card's memory can then be used by the card reader or card interface device to detect certain information stored on the card. The information stored in the card's memory can also be instantaneously updated based on changing conditions.

Card readers for use with smart cards typically employed data contacts to engage pads on the cards themselves. When the smart card is fully inserted into the card reader, the card reader or interface device is activated and data is transmitted to or from the smart card.

Existing smart cards systems do implement meal plan systems for use in school and university cafeteria-style settings or corporate restaurant settings. However, the prior art systems utilize an on-line network based system using magnetic tape stripe or bar code readers and offer limited meal plan choices. Some systems might also use smart cards having a stored electronic cash value for purchasing meals. However, they do not constitute a pre-paid meal plan system. They typically track information that allows for the restocking of the food storage areas based on the purchase of particular food products. In addition, these systems tend to be very expensive and impractical for environments serving smaller crowds such as those in smaller colleges or corporate settings.

This invention attempts to provide a low cost alternative by implementing a smart card using inexpensive point-of-sale terminals linked in a continuous or noncontinuous environment to a computer running the administration software. By implementing the smart card system, a flexible low cost meal program can be implemented.

SUMMARY OF THE INVENTION

This invention uses a smart cards in conjunction with point-of-sale terminals linked to a computer running an administration software package enabling the user of the smart card to purchase a variety of meal plans suiting personal tastes and eating habits. Food vendors will have a low cost, flexible scheme to conveniently sell food products to regular customers by removing the security and inconvenience of employing cash or credit based point-of-sale transactions. Typical of this type of food vending situation are university settings or company cafeteria environments. In both of these settings, the students or employees either purchase or are provided with a specific meal plan.

As the smart cards are read by point-of-sale terminals, a series of queries are generated to the smart card. The first query involves checking the status of the smart card against a hot list of lost, stolen or disabled cards. Next, if the card is expired, the card is disabled, and the meal is declined. If so, the meal plan functionality of the card is disabled and the meal is declined. Next, the smart card is queried as to whether it has been used that day or that week. If not, the meal plan quota data is refreshed. Next, the current time is examined to see if it falls within a valid range of defined mealtimes. If it does, the smart card is queried as to whether the mealtime quota, daily quota or weekly quota is exhausted. If any quota is exhausted, the meal is declined, otherwise the meal is vended.

DESCRIPTION OF THE DRAWINGS

Features of this invention will be better understood from the following detailed description taken in conjunction with the drawings.

FIG. 1 sets forth the data structures used in the data storage area on the smart card;

DESCRIPTION OF THE PREFERRED EMBODIMENT

Figure 2:
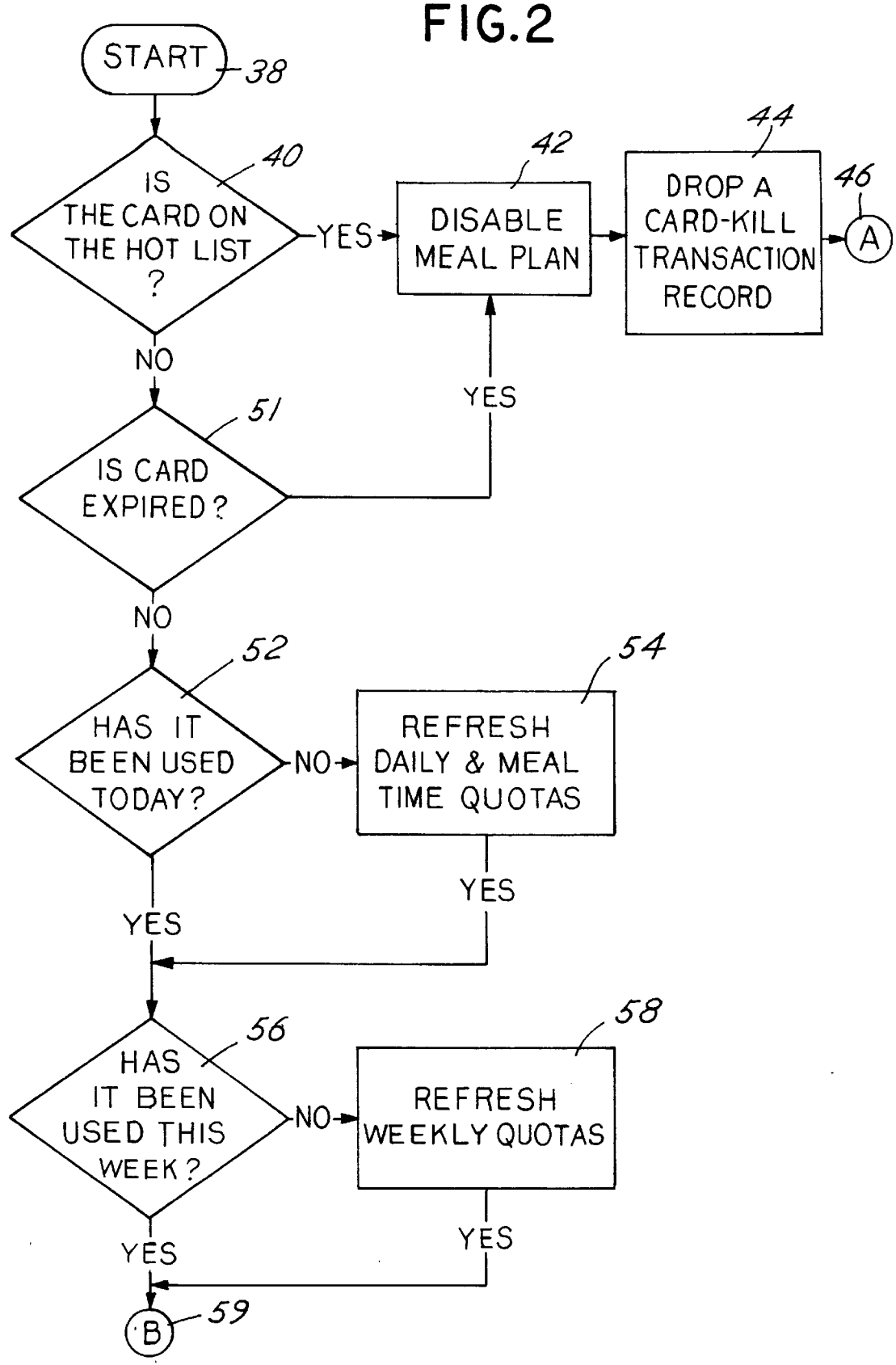
FIG. 2 is flow chart that sets forth the first part of the operational sequence implemented by a preferred embodiment of this invention.
Figure 3:
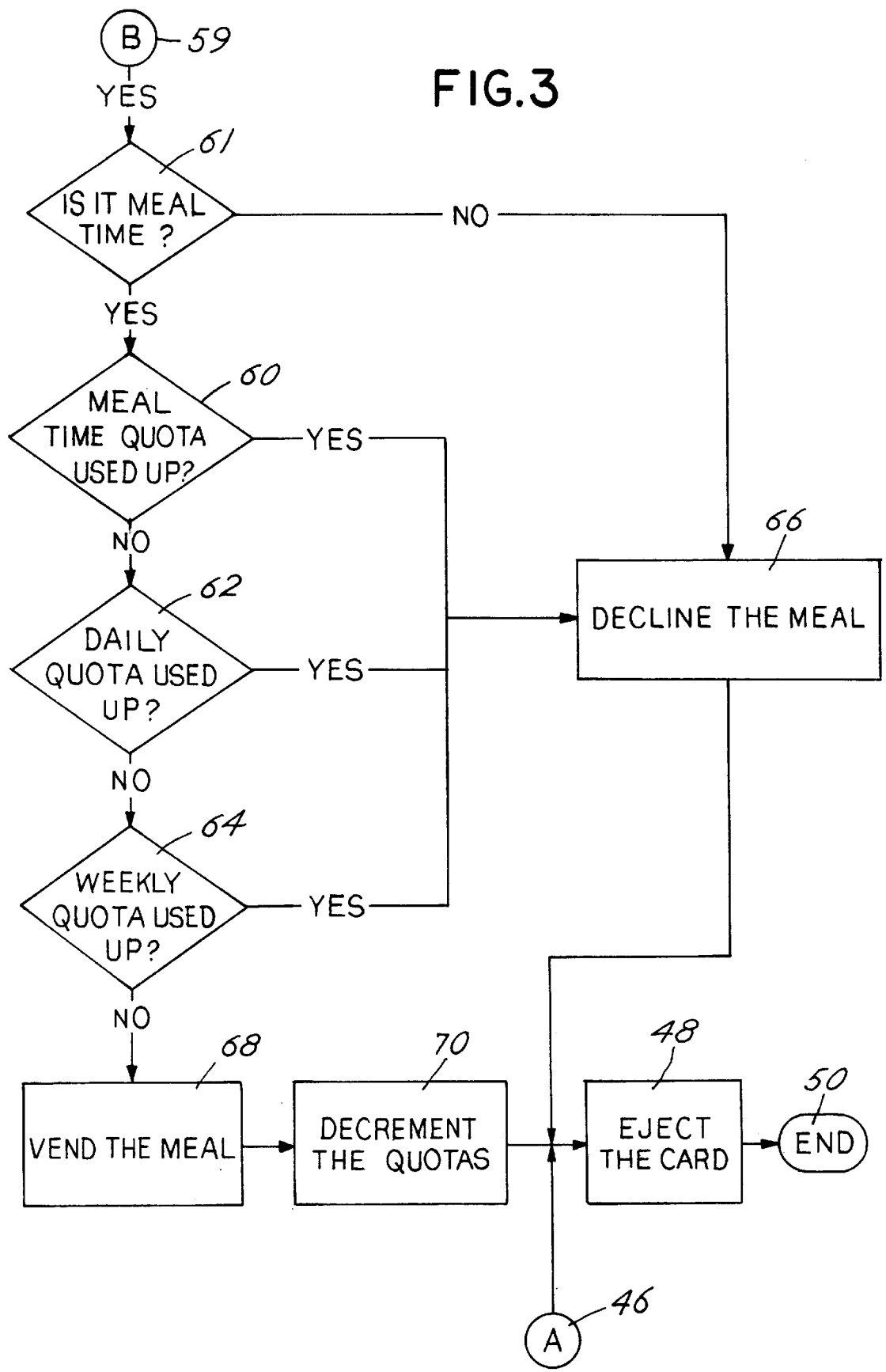
FIG. 3 is a flow chart that sets forth the second part of the operational sequence implemented by a preferred embodiment of this invention.

This invention uses a scheme for allowing cafeterias or restaurants to implement a meal plan payment system for patrons. These systems are typically used at schools or universities to allow students to purchase various meal plans to suit their specific eating habits or requirements. The scheme used in this invention is extremely flexible allowing for creative design of the different meal plans.

FIG. 1 illustrates a simplified data layout of the memory in the smart card. The smart meal system uses a credit card size card having a memory chip. The memory chip has fifteen (15) bytes of data on each card allocated for meal plan purposes. The first byte 10 contains one bit of information on the administrator 12 and one bit of information on the operator 14. The plan code 15 consists of a number between 0 and 63 representing the specific food plan paid for by the smart card user. Memory storage area 16 contains at least two bytes of information regarding the expiration date on the smart card. Memory storage area 18 contains at least two bytes of information regarding the last time the smart card was used. Memory storage area 20 contains information regarding the maximum number of meals of any type that the smart card can allow a user to purchase during one week. A typical week starts on Monday at 0000 and ends on Sunday at 2400.

Memory storage areas 22, 24, 26, 28, 30 and 32 represent the maximum number of meals that the smart card can allow a user to purchase in a day. Memory storage area 34 represents the daily quota that provides for the maximum number of meals of any type that a card user can purchase on the day of use. Memory storage area 36 represent the site assigned numeric identifier for auditing the operator and administrator sessions. Memory storage area 36 can contain two or more bytes of information. The total number bytes of memory storage on the smart card used for meal plan purposes is fifteen (15) bytes of data.

The design of the memory storage areas in the smart card allows for an extremely flexible design for structuring a variety of meal plans. As long as the meal plan is based on a weekly cycle, a variety of meal plan schemes can be devised. However, the system is limited to a maximum of six (6) meals in any twenty-four (24) hour day, with the typical day beginning and ending at midnight.

When the smart card is purchased by a user, the smart card is configured by a personal computer having a Windows NT operating system. The administrative software running on the personal computer configures the smart cards with security features and assigns a specific meal plan. The administrative software loads the smart cards with meal plan information, tracks deployed terminals and merchant information, supports the collection of meal plan transactions, configures terminal devices, and provides reports and analysis of collected information. Data security is provided by the Windows NT security architecture providing multi-level privileges for authorized users, and prevention of unauthorized users from accessing the data. Additionally, each terminal requires a login for accountability for meal plan transactions. Multi-level security ensures that only authorized users can enter, delete, or change data, while other users can only perform more routine operations such as transaction uploading.

To purchase a meal, a user inserts a smart card into a smart card reader. The smart card readers are not connected to the personal computer operating the administrative software. These smart card readers or point-of-sale terminals are autonomous and do not require continuous connections to the network for vending operations. Current technology of the point-of-sale terminals require a periodic, serial type connection to the computer loaded with the administration software for configuration, hot list updating, and transaction collection. At least one update per day is recommended. Future terminals could be linked to the computer containing the administrative software via an infrared, wireless or modem connection.

The point-of-sale terminal maintains a log of all transactions. The log includes successful vends, cards being disabled, and the login/logout of operator and administration sessions. In addition, the point-of-sale terminal also tracks error conditions that can assist in troubleshooting.

The program logic of the point-of-sale terminal maintains a list of cards that have been reported lost or stolen. Each point-of-sale terminal is periodically updated with information regarding the status of particular smart cards. The point-of-sale terminals are capable of rendering hot listed smart cards unusable for meal plan purposes when they are presented. When a lost, stolen or disabled card is presented to the terminal, the smart card is checked against the hot list of lost, stolen or disabled smart cards. If the smart card is on the hot list, the smart card plan code 15 is set to zero and the card is disabled. The operation of disabling a card does not affect the remaining data on the card but does render the card inoperable. In addition, if the plan administrator decides to disable a card, the terminal memory tracks the information.

A user-friendly, graphical user interface is used with the administration software with help sessions available to the administrator. A tool bar and hot-keys are provided to speed more frequent operations. Tool tips or "Balloon Notes" appear when appropriate to explain the operation of some of the controls. The software ensures that data entered into the system is consistent and accurate.

The program logic of the point-of-sale terminal associated with reading the card has a copy of the meal plan configuration data and updates the smart card data from the configuration data. Each time the smart card is used, the terminal logic checks the last transaction date to determine whether the card has already been used that day. If not, the daily quotas are refreshed. If the card has not been used during the current week, the weekly quota is refreshed. These queries allow the smart card to maintain the smallest amount of data while maximizing the smart card's utility with flexible meal plan schedules.

FIG. 2 illustrates the decision process when a smart card is read by a point-of-sale terminal. Upon reading the smart card in block 38, the first decision in block 40 is whether the smart card is on the hot list. The hot list refers to those smart cards that have been lost, stolen or disabled. If the smart card is on the hot list, the meal plan is disabled in block 42 and the point-of-sale terminal transmits a card-kill transaction in block 44. Through connecting node A 46, the process jumps to ejecting the smart card in block 48 from the point-of-sale terminal and ending the session in block 50.

If the smart card is not on the hot list, the next decision in block 51 is whether the smart card has expired. If the response is yes, the smart card is disabled in block 42 and the procedure for rejecting the smart card is the same as when the smart card is found on the hot list.

If the smart card has not expired in block 51, the next decision, in block 52, is whether the smart card has been used today. If the response is no, the point-of-sale terminal refreshes the daily and meal time quotas in block 54. The next decision in block 56 is whether the smart card has been used this week. If the response is no, the smart card is refreshed with new weekly quotas in block 58. If the response in block 56 is yes or the weekly quotas were refreshed in block 58, the next decision is in block 60. Node B 59 is for reference purposes of connecting FIGS. 1 and 2.

In block 61, the decision is whether the smart card is being used during the proper meal time. If the response is no, the meal is declined in block 66 and the smart card is ejected in block 48 and the session ends in block 50. If the response is yes, the next decision, in block 60, is whether the meal time quota is exhausted. If not, in block 62, the decision is whether the daily quota is exhausted. If the response is no, in block 64, the decision is whether the weekly quota is exhausted. If the response is no, the meal is vended in block 68. If the responses in any of the blocks 60, 62, or 64 is yes, then the meal is declined in block 66, the smart card is ejected in block 48, and the session ends in block 50.

If the meal is vended in block 68, the smart card has its meal time quota, daily quota and/or weekly quota decremented appropriately in block 70. The smart card is ejected in block 48 from the point-of-sale terminal, and the session ends in block 50.

Please note that while in this invention has been described in relation to certain preferred embodiments, it will be apparent to those skilled in the art that the invention is capable of alternative embodiments and that certain embodiments, of this invention can be varied considerably without departing from the basic scope and principles of the invention.

What is claimed is:

1. A food vending smart card system, comprising:
    a smart card containing a data structure for storing a plurality of bytes corresponding to meal plan data and capable of being initialized by a point-of sale terminal coupled to a system administration computer;
    the point-of-sale terminal having a periodic, noncontinuous connection to the system administration computer;
    the point-of-sale terminal capable of reading data from the smart card and writing the meal plan data to the smart card to indicate purchase of a meal; and
    the point-of sale terminal capable of periodically refreshing the meal plan data by writing updated meal plan data from the point-of-sale terminal to the smart card.

2. The food vending smart card system according to claim 1 where the meal plan data comprises information for authorization of usage.

3. The food vending smart card system according to claim 1 where the meal plan data [includes] comprises information regarding an expiration date of the smart card.

4. The food vending smart card system according to claim 1 where the meal plan data comprises information regarding a specific meal plan scheme.

5. The food vending smart card system according to claim 1 where the meal plan data comprises information regarding a specific number of meals to vend in a preset time period.

6. A food vending smart card system, comprising:
a smart card capable of being initialized by a computer and containing data comprising a plurality of bytes;
the smart card containing a first data field containing information regarding a system administrator, a system operator and a plan code;
the smart card containing a second data field containing information regarding an expiration date of the smart card;
the smart card containing a third data field containing information regarding a last transaction date;
the smart card containing a fourth data field containing information regarding a weekly quota:
the smart card containing a fifth data field containing information regarding a meal quota;
the smart card containing a sixth data field containing information regarding a daily quota;
the smart card containing a seventh data field containing information regarding an operator identification;
a point-of-sale terminal coupled to the computer and capable of reading the data fields on the smart card and determining whether the smart card can be used; and
the point-of-sale terminal capable of periodically refreshing the data on the smart card by writing the data in the data fields updating the weekly quota and writing meal purchase data to the smart card indicating that the smart card was used to purchase a meal.

7. The food vending smart card system according to claim 6, where the smart card is updated with information regarding a system administrator, a system operator and a plan code by transferring new data to the first data field.

8. The food vending smart card system according to claim 6, where the smart card is updated with information regarding a new weekly quota by transferring new data to the fourth data field.

9. The food vending smart card system according to claim 6, where the smart card is updated with information regarding meal plans by transferring new data to the fifth data field.

10. The food vending smart card system according to claim 6, where the smart card is updated with information regarding a daily quota by transferring new data to the sixth data field.

11. A food vending smart card system, comprising:
a smart card capable of being initialized by a computer and containing data comprising a plurality of bytes;
the computer capable of transferring the data to the smart card containing information regarding a meal plan scheme;
a point-of-sale terminal coupled to the computer and capable of reading the data on the smart card;
the data containing at least one byte with information regarding a system administrator, a system operator and a plan code;
the data containing at least one byte regarding an expiration date of the smart card;
the data containing at least one byte regarding a last transaction date;
the data containing at least one byte regarding a weekly quota;
the data containing at least one byte regarding a meal quota;
the data containing at least one byte regarding a daily quota;
the data containing at least one byte regarding an operator identification; and
the data capable of being periodically refreshed by the point-of-sale terminal.

12. A method for using a food vending smart card scheme consisting of the steps:
reading the smart card by a point-of-sale terminal;
if the smart card has not been used on the day the smart card is read by the point-of-sale terminal, refreshing daily and meal time quotas on the smart card;
if the smart card has not been used during the week the smart card is used, refreshing weekly quotas on the smart card;
if the meal time quota has been used, declining the meal;
if the daily quota has been exhausted, declining the meal;
if the weekly quota has been exhausted, declining the meal; and
otherwise decreasing the meal time quota, the daily quota and the weekly quota by one.

13. A food vending smart card system, comprising:
a smart card capable of being initialized by a computer and containing data comprising a plurality of bytes;
means for transferring the data to the smart card containing information regarding a meal plan scheme;
means for reading and writing the data on the smart card;
means for storing data on the smart card with information regarding a system administrator, a system operator and a plan code;
means for storing data on the smart card regarding an expiration date of the smart card;
means for storing data on the smart card regarding a last transaction date;
means for storing data on the smart card regarding a weekly quota;
means for storing data on the smart card regarding a meal quota;
means for storing data on the smart card regarding a daily quota;
means for storing data on the smart card regarding an operator identification; and
means for periodically refreshing the meal quota data by the means for reading and writing the data on the smart card.

14. The food vending smart card system according to claim 6, where the point-of-sale terminal and the computer are coupled by a non-continuous connection.

15. The food vending smart card system according to claim 6, where the point-of-sale terminal and the computer are coupled by a continuous connection.

16. The food vending smart card system according to claim 11, where the point-of-sale terminal and the computer are coupled by a non-continuous connection.

17. The food vending smart card system according to claim 11, where the point-of-sale terminal and the computer are coupled by a continuous connection.

18. The food vending smart card system according to claim 13, where the means for reading and writing the data and the computer are coupled by a non-continuous connection.

19. The food vending smart card system according to claim 13, where the means for reading and writing the data and the computer are coupled by a continuous connection.

* * * * *